United States Patent [19]
Todd et al.

[11] Patent Number: 5,168,778
[45] Date of Patent: Dec. 8, 1992

[54] CVT DOWNSHIFT CONTROL STRATEGY TO MINIMIZE SLIP AT THE DRIVE PULLEY

[75] Inventors: Kevin B. Todd, Freeville; Alan L. Miller, Ithaca, both of N.Y.

[73] Assignee: Borg-Warner Automotive, Inc., Sterling Heights, Mich.

[21] Appl. No.: 752,064

[22] Filed: Aug. 29, 1991

[51] Int. Cl.$^5$ .............................................. B60K 41/16
[52] U.S. Cl. ........................................ 74/866; 474/18
[58] Field of Search ..................... 74/866; 474/18, 28

[56] References Cited

U.S. PATENT DOCUMENTS

| | | | |
|---|---|---|---|
| 4,387,608 | 6/1983 | Mohl et al. | 74/866 |
| 4,466,521 | 8/1984 | Hattori et al. | 74/866 X |
| 4,522,086 | 6/1985 | Haley | 74/867 |
| 4,631,043 | 12/1986 | Tokoro et al. | 474/18 |
| 4,648,496 | 3/1987 | Petzold et al. | 192/0.076 |
| 4,673,378 | 6/1987 | Tokoro et al. | 474/18 |
| 4,674,363 | 6/1987 | Miyawaki | 74/866 |
| 4,702,725 | 10/1987 | Kuono et al. | 474/18 |
| 4,718,308 | 1/1988 | Haley | 74/867 X |
| 4,734,082 | 3/1988 | Tezuko | 74/867 X |
| 4,982,822 | 1/1991 | Petzold et al. | 74/866 X |
| 5,006,093 | 4/1991 | Itoh et al. | 74/867 X |
| 5,031,481 | 7/1991 | Algrain et al. | 74/866 X |

Primary Examiner—Leslie A. Braun
Assistant Examiner—Ryan W. Massey
Attorney, Agent, or Firm—Willian Brinks Olds Hofer Gilson & Lione

[57] ABSTRACT

New methods for controlling an automotive continuously variable transmission (CVT) during downshifting such that chain-belt slippage will not occur. The relationship between the primary and secondary sheave forces is used to predict and control the primary force so that the primary clamping force is sufficient to prevent slippage.

13 Claims, 5 Drawing Sheets

CVT DOWNSHIFT CONTROL STRATEGY TO MINIMIZE SLIP AT THE DRIVE PULLEY

BACKGROUND OF THE INVENTION

This invention is directed to a line pressure control system for a continuously variable transmission (CVT). Such a transmission includes fluid-actuated primary and secondary pulleys intercoupled by a flexible chain or belt, the effective diameters of the pulleys being varied simultaneously but in opposite directions to effect a smooth, continuous change in the drive ratio between an input driving shaft and an output driven shaft. The primary pulley is controlled by fluid under pressure to regulate the effective drive ratio of the transmission, while the secondary pulley is supplied with fluid at a pressure sufficient to prevent slippage of the belt in order to transfer torque from the primary pulley to the secondary pulley. A fluid-actuated clutch is generally employed to transfer drive torque from the transmission (namely, from the secondary pulley) to an associated driveline. The line pressure or secondary pressure is the highest hydraulic pressure in the CVT and is that which is applied to the secondary pulley to ensure an adequate clamping force and tension on the belt so that it will not slip.

Various systems have been developed for controlling the different hydraulic pressures required to operate a CVT, such as those systems described in U.S. Pat. Nos. 4,718,308, 4,648,496 and 4,982,822, which are incorporated herein by reference.

In the typical CVT control system, the hydraulic pressure acting on the primary sheave during a downshift is reduced to allow the primary sheave halves to open up and reduce the effective diameter of the primary sheave. It has been found that when downshifting under some conditions there is insufficient clamping force and slippage occurs between the primary drive sheave and the drive chain or belt. Such slippage can result in damage to the sheaves and chain or belt.

SUMMARY OF THE INVENTION

The present invention is directed to a control strategy for controlling a CVT during a downshift. The present invention reduces or eliminates undesirable slippage by insuring that a force is exerted on the primary sheave during a downshift sufficient to substantially prevent slippage. This is accomplished through several different methods. The first and second methods described below involved a modification of the control of the existing hardware shown in the above referred to U.S. Pat. No. 4,982,822. The third method described below utilizes an additional pressure sensor with the existing hardware for measuring the actual pressure at the primary sheave in the modified control strategy.

The preferred embodiments described below utilize a conventional CVT control strategy during constant ratio and upshift conditions. During downshifts, these embodiments use the line pressure controller and the ratio controller to control the chain-belt ratio and the force (primary force) applied to the primary sheave. The result is a controllable downshift rate without the primary force dropping below the force necessary to prevent slippage between the chain-belt and the primary sheave.

During a downshift, the force balance is such that the force ratio, that is, the ratio of the primary force to the force applied to the secondary sheave (secondary force), can drop below one. In the conventional CVT control strategy, the secondary force is controlled to insure that the secondary force is always greater than the minimum secondary force necessary to prevent slippage between the chain-belt and the secondary sheave. In the prior art system when the force balance is such that the force ratio drops below one during a downshift then slippage can occur between the chain-belt and the primary sheave. Such slippage is undesirable because it can result in damage to the chain-belt and or the primary sheave.

The embodiments of the present invention differ from the prior art system in that during a downshift, the primary force, not the secondary force, is controlled to insure that it is always greater than the minimum force necessary to prevent slippage between the chain-belt and the primary sheave. Under this new strategy if the force ratio drops below one, the secondary force will always be greater than necessary to prevent slippage between the chain-belt and the secondary sheave and the possibility of slippage is eliminated at both sheaves.

In the prior art system the secondary force, also referred to as the line pressure, is controlled. The primary force is not measured or controlled. There is, however, an interaction between the primary and secondary forces, and this interaction can be utilized to predict and control the primary force. By relying upon this interaction, the first and second embodiments described below operate without the addition of sensors to measure the primary force. In the third embodiment described below, such a sensor has been added.

In the first embodiment, in which there is no sensor to measure the primary force, the following steps are followed to accomplish the subject invention: (1) the primary force necessary to give a set chain-belt slip safety factor on the primary is calculated; (2) a shift rate is selected and the corresponding ratio controller duty cycle is determined from a look-up table that was derived from test data; (3) the line or secondary pressure necessary to achieve the desired primary force is determined from a look-up table that was derived from test data. If during a fast downshift, the line pressure needed to achieve the desired primary force exceeds the limits of the available line pressure then the shift rate must be reduced until an acceptable desired line pressure is reached.

The second embodiment adds a primary pressure estimator to the control system. The third embodiment utilizes a pressure sensor to read the actual primary pressure which is used in place of the estimated primary pressure in the control strategy.

DESCRIPTION OF THE DRAWINGS

Reference is made to the following description in conjunction with the accompanying drawings in which like reference numbers identify like components, and in which.

DETAILED DESCRIPTION OF THE PREFERRED EMBODIMENTS

Figure 1:
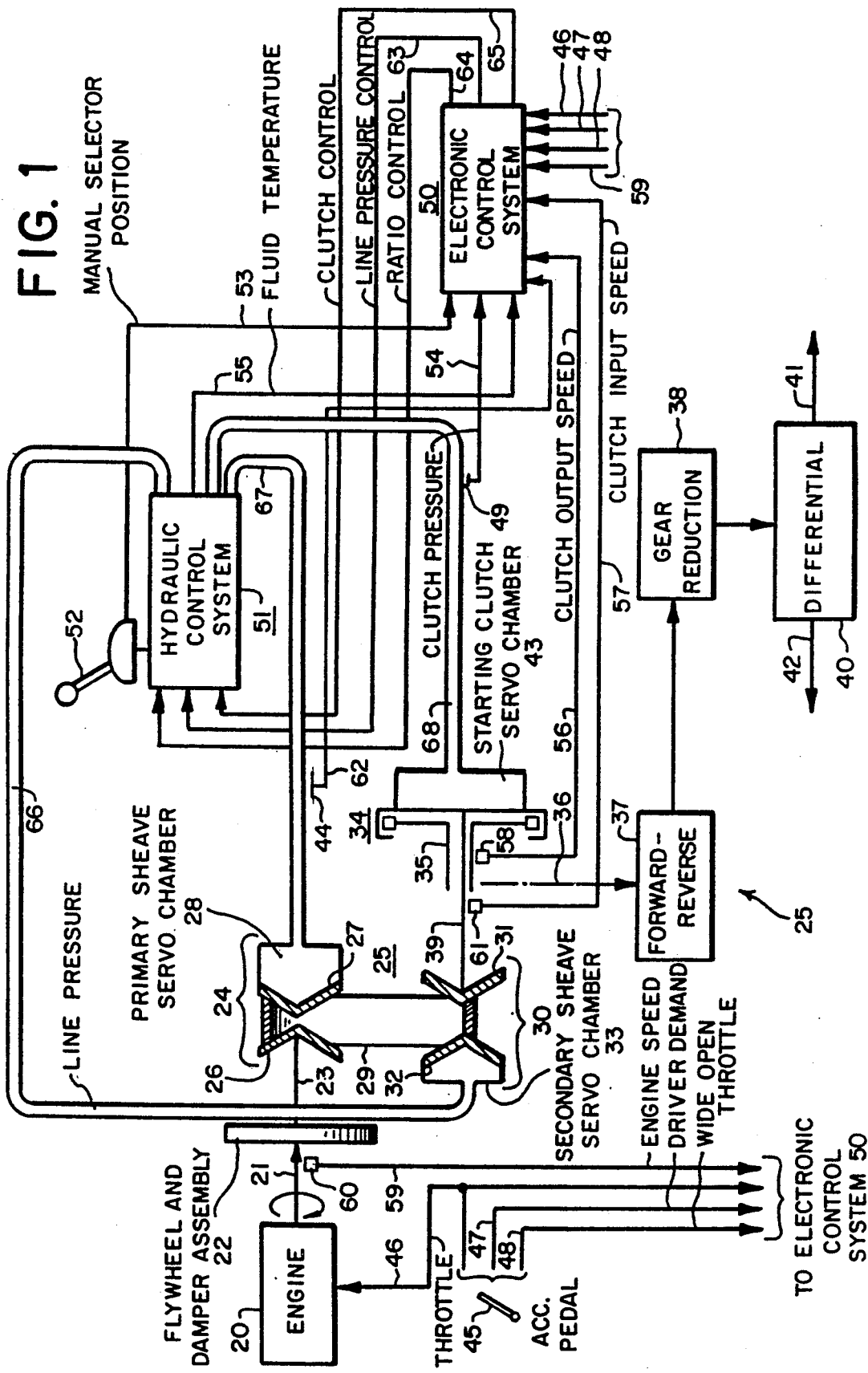
FIG. 1 is a block diagram of a continuously variable transmission including representations of the primary and secondary sheaves acted on by hydraulic fluid under pressure controlled by the control system, constructed in accordance with the invention.

The system, as shown in FIG. 1 contains many components that are illustrated and described in much greater detail in the aforementioned United States Patents. The teachings of these prior disclosures are incorporated herein by reference.

Referring now to FIG. 1, the general power flow in an automotive layout is shown from an engine 20 over an engine output shaft 21, flywheel and damper assembly 22 and transmission input shaft 23 to drive the primary pulley 24 of a continuously variable transmission 25. Primary pulley 24 has a fixed sheave 26 and a movable sheave 27, with a primary sheave chamber 28 positioned to admit and discharge fluid and thus adjust the position of movable sheave 27. Secondary pulley 30 has an axially fixed sheave 31 and an axially movable sheave 32, with a secondary sheave chamber 33 positioned to admit and discharge fluid to change the effective diameter of pulley 30. An endless drive element 29 of metal or suitable elastomeric material intercouples pulleys 24 and 30. The rotary output of secondary pulley 30 is supplied over shaft 39 to one side of a clutch 34. The other side of clutch 34 is connected to shaft 35. Drive from shaft 35 is translated over a gear set (represented by dash-dot construction line 36) to a forward-reverse gear selector assembly 37. Drive from gear selector assembly 37 flows through a gear reduction device 38 to a differential assembly 40 which includes output shafts 41 and 42 which drive the wheels (not shown) of the vehicle.

The vehicle operator has manual control over the accelerator pedal 45, and the manual selector lever 52 which will be discussed in more detail later. Through these input means the operator directs the CVT control system.

The term "downshift" or "downshifting" as used herein refers to the process of changing the relative sizes of the primary 24 and secondary 30 pulleys such that the rotary speed of shaft 39 and thus the speed of the vehicle is reduced for a given engine speed.

The CVT control system includes an electronic control system 50 and a hydraulic control system 51. The position of accelerator pedal 45 is sensed and transmitted over lines 46, 47 and 48 to the electronic control system 50. The position of the manual selector lever 52, which has neutral, park, forward and reverse positions, is sensed and transmitted over line 53 to the electronic control system 50. A pressure transducer 49 measures the pressure in the clutch 34 hydraulic conduit 68 and transmits this information over line 54 to electronic control system 50. A signal representing the temperature of the hydraulic transmission fluid is passed from hydraulic control system 51 over line 55 to the electronic control system 50. A sensor 58 is positioned adjacent to clutch output shaft 35 to measure its speed of rotation and to transmit this information over line 56 to the electronic control system 50. A sensor 61 is positioned adjacent shaft 39 which transmits the clutch shaft's rotary input speed signal over line 57 to the electronic control system 50. A sensor 60 is located adjacent to the engine output shaft 21 and transmits over line 59 a signal representing the engine speed. The electronic control system includes a microcomputer that is functionally implemented by software. Equations, constants such as factors of safety and look-up tables are stored in the microcomputer and can be accessed when needed by the control system. The CVT control system described thus far in this paragraph is identical to the CVT control system disclosed to the above referred to U.S. Pat. No. 4,982,822.

An additional pressure transducer 44, which was not present in the prior device, is provided to measure the hydraulic pressure at the primary sheave chamber 28. This information is transmitted over line 62 to the electronic control system 50.

All of the above information is received by the microcomputer, which is a part of the electronic control system 50, stored as data and used and operated upon by the computer software. After processing the data the microcomputer of the electronic control system 50 sends three pulse width modulated (PWM) control signals over lines 63, 64 and 65 to the hydraulic control system 51. The PWM signal on line 63 is a control signal to regulate the line or secondary pressure produced by a pump assembly within the hydraulic control system. The output PWM signal on line 64 is a ratio control signal, used to establish the desired ratio of CVT 25. The third output PWM signal, on line 65, is used to regulate the operation of clutch 34.

Hydraulic control system 51 directs fluid, at line or secondary pressure, through conduit 66 to the secondary sheave chamber 33. The hydraulic control system dispenses hydraulic fluid, at the appropriate pressure, through conduit 67 to primary sheave chamber 28 to govern ratio changes, maintain a steady ratio or to prevent slippage between the chain-belt 29 and the primary sheave 27. In addition, a fluid is dispensed through conduit 68 to clutch chamber 43 to apply and release the clutch 34.

In FIGS. 2–5 and the equations discussed below, the following definitions apply.

| | |
|---|---|
| A1 | primary actuator pressure area |
| A2 | secondary actuator pressure area |
| ARCMAX | ratio controller maximum flow area |
| B | shifting energy loss coefficient |
| $\beta$ | sheave angle |
| DC | ratio control duty cycle |
| DClim | ratio control duty cycle limit for downshift strategy |
| DCNULL | ratio control duty cycle for no shift |
| $\Delta$tloop | time between updates of primary radius |
| $\Delta$tset | shift time for downshift strategy |
| ECON1 | constant based on ratio control valve parameters |
| F1 | primary force (lb) |
| F1des | desired primary force for downshift strategy |
| F1min | minimum allowable primary force to prevent slip |
| F2 | secondary force (lb) |
| F2des | desired secondary force for downshift strategy |
| F2min | minimum allowable secondary force to prevent slip |
| FS2LOW | minimum secondary sheave spring force |
| KC1 | primary actuator centrifugal force coefficient |
| KC2 | secondary actuator centrifugal force coefficient |
| KS2 | secondary sheave spring constant |
| KV1 | ratio control valve gain |
| $\mu$ | friction coefficient |
| MAP | primary torque look up table based upon throttle position and primary speed |
| N1 | primary speed |
| N1set | primary speed set point |

| | -continued |
|---|---|
| N2 | secondary speed |
| P1 | primary pressure (psi) |
| P1des | desired primary pressure for downshift strategy |
| P1est | estimated primary pressure |
| P1min | minimum primary pressure limit |
| P1set | primary pressure set point |
| P2 | secondary pressure (psi) |
| P2des | desired secondary pressure for downshift strategy |
| P2max | maximum secondary pressure limit |
| P2set | line pressure set point |
| P2stat | existing conventional line pressure set point schedule |
| PSI | assumed active angle |
| R1 | primary radius |
| R1old | saved value of primary radius |
| R2 | secondary radius |
| RB | chain-belt ratio |
| RDC | ratio controller duty cycle |
| SF | chain-belt slip safety factor |
| T1 | primary torque |
| T2 | secondary torque |
| TH | throttle position (%) |
| XRCMAX | ratio controller maximum spool displacement |
| Y2 | secondary sheave position |
| Y2MAX | maximum secondary sheave position |

Figure 2:
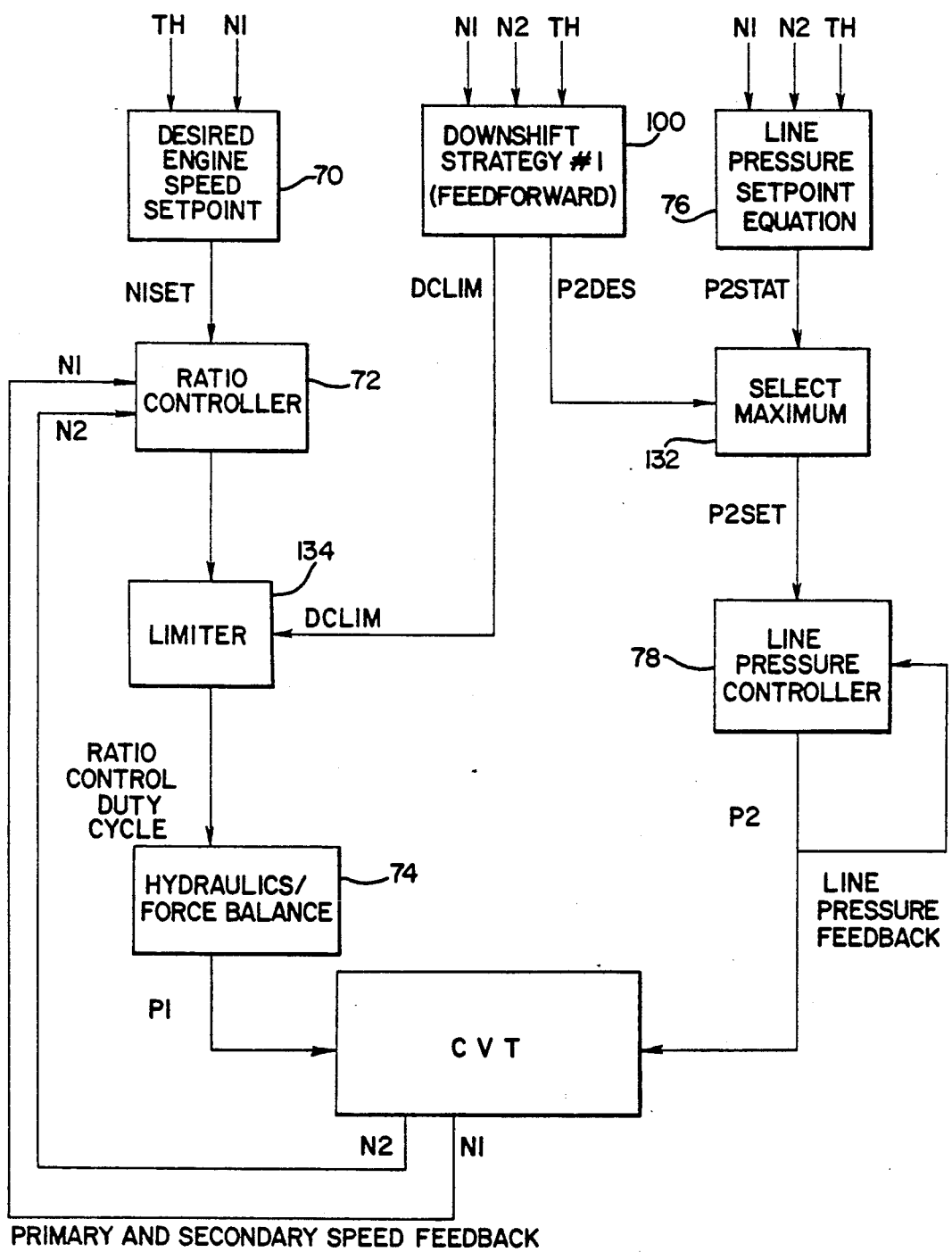
FIG. 2 is a functional block diagram or schematic of a first method for achieving the subject invention.

FIG. 2 is a functional block diagram or schematic of the first embodiment described below. Initially, the conventional or prior art control system will be discussed with reference to relevant portions of FIG. 2. The upper-most block 70 on the left side includes a representation that the throttle setting TH and initial speed N1 are input by the operator. This operator input results in the determination of an engine speed set point N1SET which is determined from a look-up table based on throttle position and initial speed. N1SET is input into the Ratio Controller block 72 which adjusts the duty cycle to achieve the appropriate ratio. The Ratio Controller is a flow control device which receives Duty Cycle impulses and adjusts the primary sheave's radius to give the desired chain-belt ratio. The primary N1 and secondary N2 speeds are fed back into the Ratio Controller. The block 74 identified as Hydraulics/Force Balance represents the hydraulic/mechanical portion of the CVT transmission. The operations that occur in the Hydraulics/Force Balance block are fully explained in the previously referred to U.S. Pat. No. 4,982,822 and are not important to an understanding of the subject invention.

As shown at the right hand side of FIG. 2 the throttle setting TH, the initial primary speed N1, as well as the secondary speed N2, are input into a block 76 labeled Line Pressure Setpoint Equation. The Line Pressure Set Point P2SET is determined by an equation based on a static force balance so that the clamping force on the secondary sheave is in excess of the required clamping force by a constant factor of safety. The Line Pressure Set Point is input into the Line Pressure Controller represented by block 78. The Line Pressure Controller establishes the line pressure or secondary pressure that is supplied to the secondary sheave chamber of the CVT. An indication of the line or secondary pressure is fed back to the Line Pressure Controller to thus maintain the established pressure.

Figure 3:
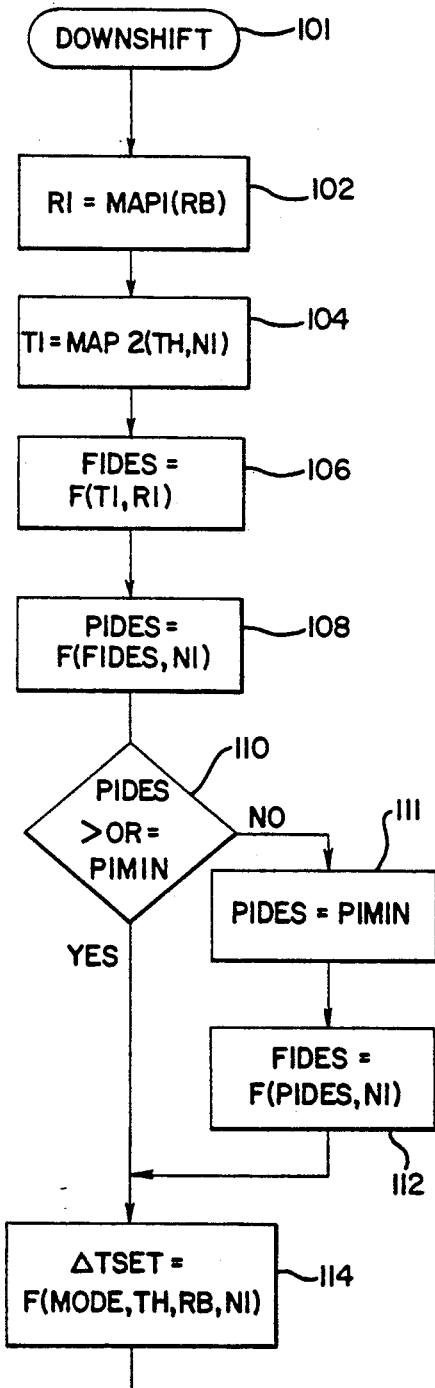
FIG. 3 is a logic flow chart illustrating details of one block of FIG. 2.
Figure 3:
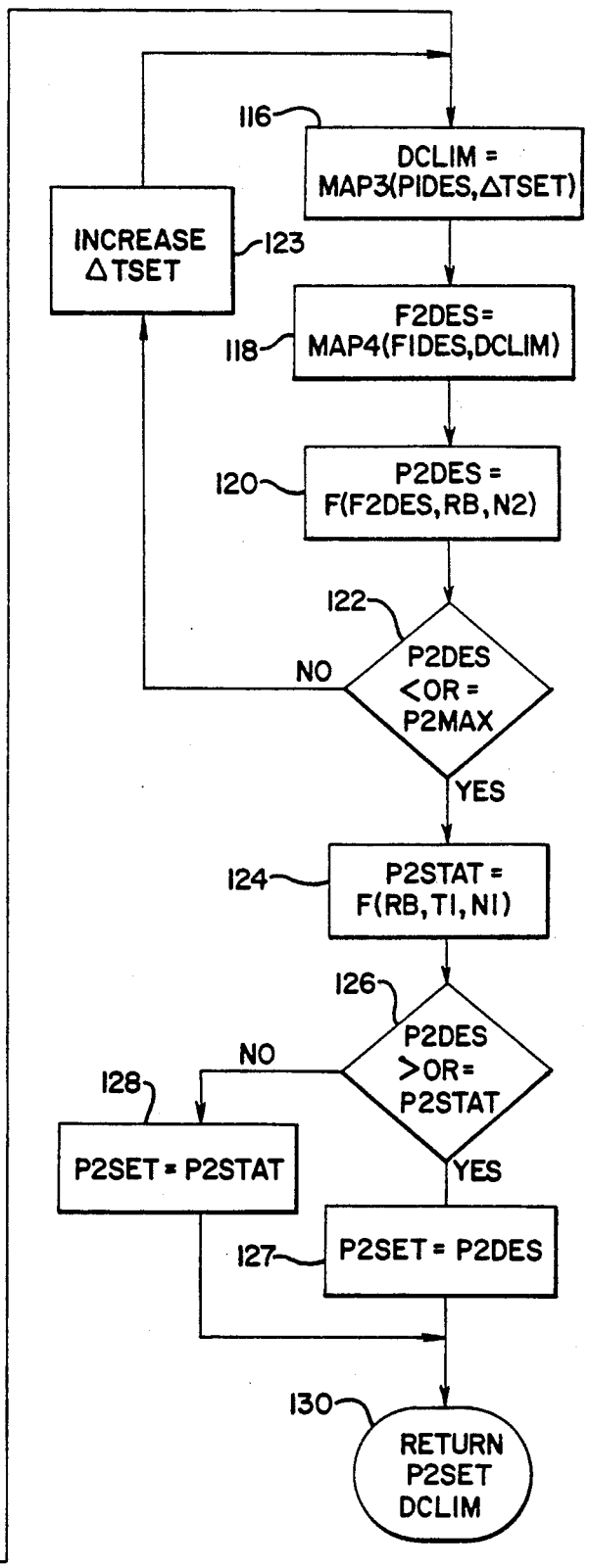

The central vertical flow stream of FIG. 2 represents what is occurring in the first embodiment during the downshifting operation. FIG. 3 is a more detailed flow chart of what occurs in this embodiment and explains what occurs in the central vertical flow stream of FIG. 2 that is identified as block 100 and labeled Downshift Strategy #1 plus what occurs in the Select Maximum block 132 of FIG. 2.

Referring now to FIG. 3, when a downshift is initiated at block 101, a new primary ratio R1 is established at block 102, and a new primary torque T1 is established at block 104. New desired primary force (F1des) and desired primary pressure (P1des) are calculated at blocks 106, 108 from the following equations:

$$F1des = f(T1, R1) = SF \frac{T1 \cos(\beta)}{2 \mu R1}$$

$$F1des = f(P1des, N1) = (P1des)(A1) + (N1^2)(KC1)$$

$$P1des = f(F1des, N1) = \frac{F1des - (N1^2)(KC1)}{A1}$$

The decision circuit, blocks 110-112, checks and makes the necessary adjustments to insure that P1des is larger or equal to the primary pressure minimum. In the next block 114 a desired shift rate ($\Delta$tset) is set based upon available information that is a function of the Mode of operation of the CVT, throttle position, chain-belt ratio and engine speed. The CVT has seven Modes: neutral, inhibit, hold, start, deceleration, acceleration and drive. In each individual Mode there are entrance and exit requirements and a strategy for line pressure, ratio and clutch control. The purpose of the inhibit mode is to inhibit shifting into reverse during higher vehicle speeds. The other Modes are believed to be self explanatory.

Next a ratio duty cycle limit for the downshift strategy (DClim) is selected at block 116 from data generated from no-load test data.

In the next block 118 a desired secondary force (F2des) necessary to generate the desired primary force at the selected ratio controller duty cycle limit is selected from a table generated from no-load test data.

A desired secondary line pressure (P2des) based upon the desired secondary force is then calculated in block 120 in accordance with the following formula:

$$P2des = f(F2des, N2, RB) =$$

$$\frac{F2des - (N2^2)(KC2) - (Y2MAX - Y2)(KS2) - FS2LOW}{A2}$$

where: $Y2 = f(RB)$

It should be noted that the terms secondary line pressure and line pressure refer to the same pressure and are used interchangeably.

In the decision block 122 a check is made to be sure that the pressure P2des is within the line pressure limits. If it is not, the shift time is adjusted at block 123, and control is returned to block 116 for determining a new DClim.

The conventional line pressure set point P2stat, which is a function of the chain-belt ratio RB, primary torque T1 and primary speed N1, is determined in block 124.

In the next decision block circuit, 126-128, which corresponds to the Select Maximum block 132 of FIG. 2, P2des is compared to the conventional line pressure set point (P2stat) and the higher of the two is selected for the new actual line pressure set point (P2set).

In the final block 130 the newly established line pressure set point (P2set) and ratio controller duty cycle limit (DClim) are returned to the conventional CVT control strategy. It should be noted that this return of the DClim and P2set is illustrated in FIG. 2. In FIG. 2 the Select Maximum block 132 corresponds to blocks 124, 126, 127 and 128 of FIG. 3. It should also be noted that in FIG. 2 that the Limiter block 134 receives the ratio duty cycle limit DCLIM that was selected in block 116.

Figure 4:
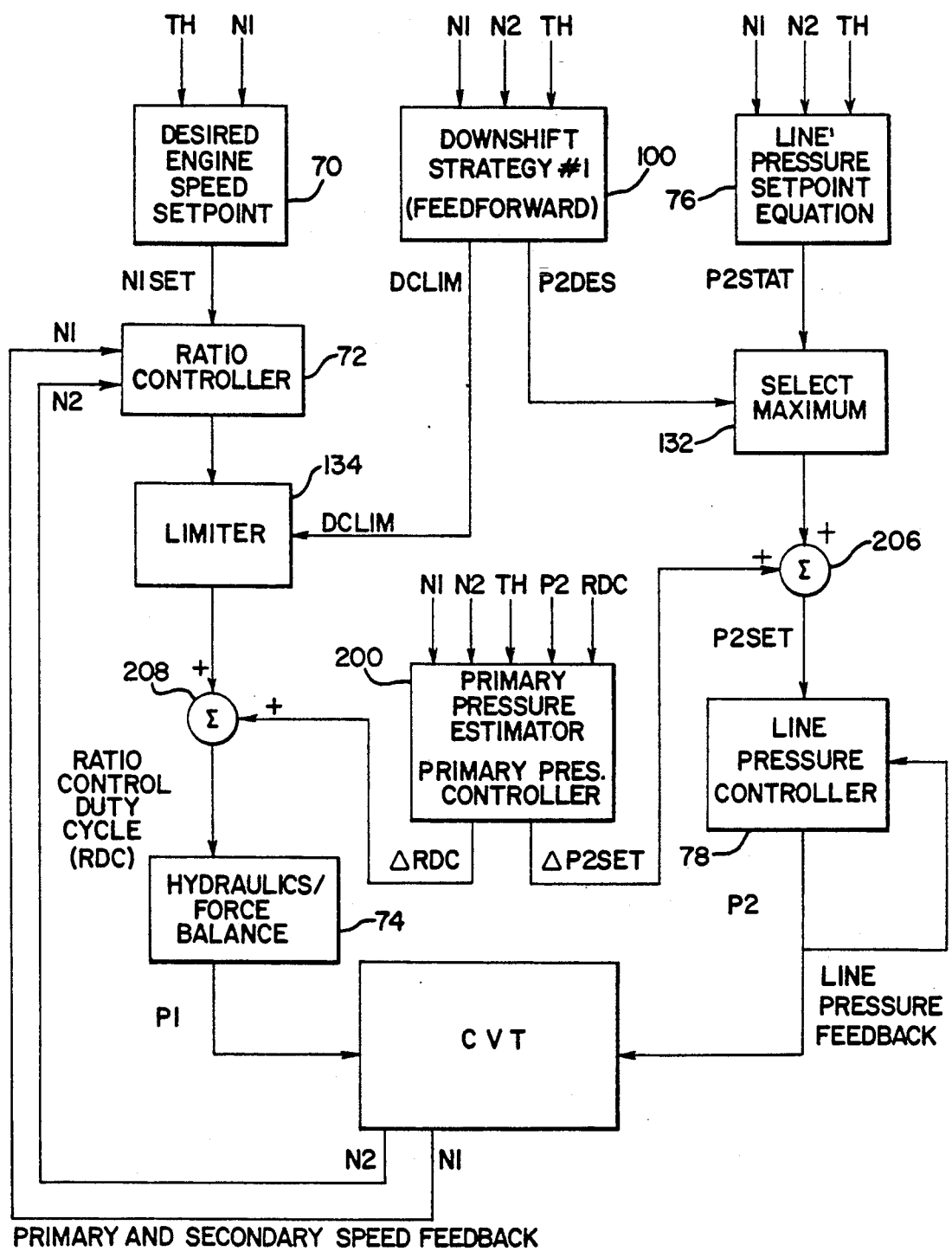
FIG. 4 and 5 are functional block diagrams or schematics of a second method for achieving the subject invention.
Figure 5:
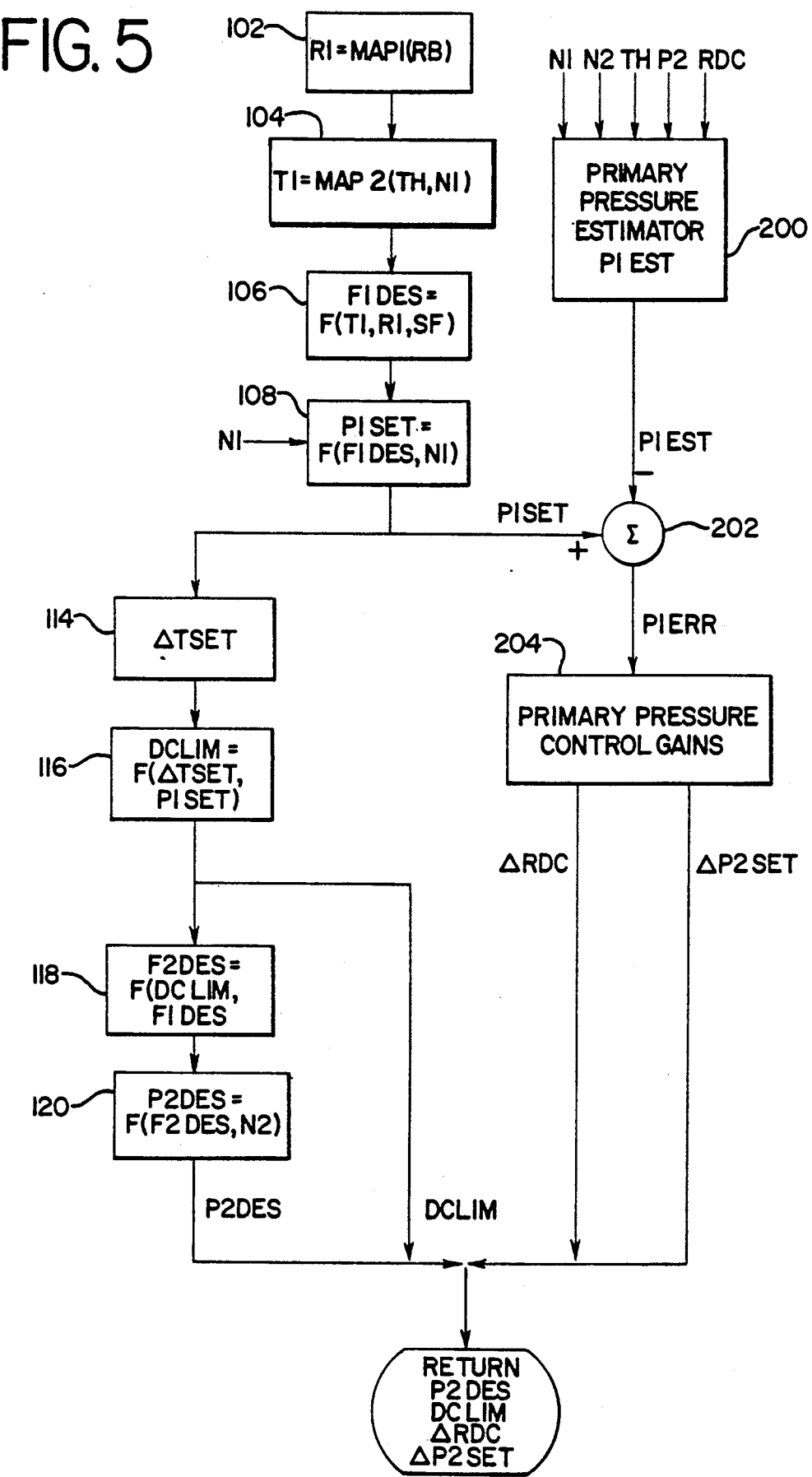

Referring now to FIGS. 4 and 5 the second embodiment will be described. This embodiment uses the system described in the first embodiment disclosed in FIGS. 2 and 3 but adds a primary pressure estimator to that embodiment. The primary pressure estimator, represented in FIG. 4 by block 200, will be discussed with reference to FIGS. 4 and 5. FIG. 4 shows the entire CVT flow chart strategy including the new Primary Pressure Estimator. FIG. 5 is more specific as to how the Primary Pressure Estimator functions.

The Primary Pressure Estimator makes a calculation of the expected primary pressure based upon the physics of the sheave and chain-belt system and the hydraulic control system. In the preferred estimator method, which is a function of primary speed, secondary speed, throttle and line pressure, the two constants are determined empirically. The first constant B represents an energy loss that occurs during shifting. The second constant PSI represents the active angle, which is the angle around the sheave where the chain belt tension is changing. The equations for the preferred estimator method follow:

$$F2 = P2A2 + (N2^2)(KC2) + (Y2MAX - Y2)(KS2) + FS2LOW$$
$$F1est = F2 + 2B\tan\beta\,[(R1 - R1old - R2 + R2old)/\Delta t loop] + [(\pi - PSI)/(2\tan\beta)](T1/R1)$$
$$P1est = [F1est - (N1^2)(KC1)]/A1$$

The second estimator method is based on the hydraulic ratio control valve. The equations for the second estimator method follow:

$$ECON1 = [(\tan\beta\, A1\, XRCMAX)/(KV1\, ARCMAX)]^2$$

If $DC < DCNULL$ then:

$$P1est = ECON1\left[\frac{(R1 - R1old)/\Delta t loop}{(DC\, KV1 - KRCMAX/2)}\right]^2$$

If $DC > DCNULL$ then:
$$P1est = [P2 - ECON1]$$
$$[(\{R1 - R1old\}/\Delta t loop)/(DC\, KV1 - \{XRCMAX/2\})]^2$$

The estimated primary pressure (P1est) is then compared to the primary pressure set point (P1set) to generate an error signal. This operation is performed in the circular enclosure 202 identified by the summation symbol ($\Sigma$) of FIG. 5.

In block 204 the primary pressure error signal adjustment terms ($\Delta$P2set and $\Delta$RDC) for the line pressure set point and the ratio controller duty cycle limit are calculated.

The error signal adjustment terms are then added to the set points determined from the embodiment disclosed in FIGS. 2 and 3. This last step of adding the error signals is indicated in FIG. 4 in the circular enclosures 206 and 208 identified by the summation symbols ($\Sigma$).

The third embodiment uses an additional pressure sensor to measure the actual primary Pressure. Reference is hereby made to FIG. 1 which includes a pressure transducer 44 in the conduit 67 for the primary sheave chamber 28. This signal is transmitted through line 62 to the electronic control system. The measured primary pressure is used to replace the estimated primary pressure of the second embodiment. All other steps in embodiment three are the same as in embodiment two.

In the preferred arrangement illustrated in FIG. 1 the clutch 34 is located after the CVT 25. In a secondary arrangement the clutch 34 could be located between the engine 20 and the CVT 25. In such an arrangement the only factor in the preferred arrangement that could be effected is the primary torque T1. If, when using such a secondary arrangement, the absolute value of the difference between the engine speed NE and the primary speed N1 is greater than the slip tolerance of the clutch than the primary torque T1 becomes a factor of both engine speed NE and primary speed N1. The term, slip tolerance, refers to the slippage that occurs when the clutch is locked up. In this event when establishing a new primary torque at block 104 in FIG. 3 the engine speed NE and a clutch constant must also be considered. The three embodiments of the invention, disclosed herein, could be used in either the primary or the secondary arrangement.

What is claimed is:

1. A method of downshifting a continuously variable transmission, said transmission having adjustable radius primary and secondary pulleys being connected by an endless drive element, said pulleys being hydraulically controlled by primary and secondary forces, whereby slip between the drive element and the primary pulley is avoided by controlling the drive element ratio and primary force, said method of downshifting comprising the steps of:
   a) initiating a downshift;
   b) calculating (108) a desired primary pressure that corresponds to the downshift;
   c) selecting (116) a ratio controller duty cycle limit corresponding to the downshift;
   d) calculating (120) a desired secondary pressure that corresponds to a desired primary force;
   e) comparing (122) said desired secondary pressure to a known secondary pressure maximum;
   f) repeating steps (c) through (e) for values of secondary pressure that exceed the known secondary pressure maximum until an acceptable desired secondary pressure is achieved;
   g) comparing (126-128) the acceptable secondary pressure to the existing secondary pressure and selecting (130) the higher as the new secondary pressure set point; and
   h) using the selected ratio controller duty cycle limit and the new line pressure set point in the continuously variable transmission.

2. The invention as set forth in claim 1 wherein the new desired primary pressure in step b) is initially calculated (108) in accordance with an equation in which the new desired primary pressure is equal to the desired primary force minus the primary speed squared multiplied by the primary actuator centrifugal force coefficient all divided by the primary actuators pressure areas.

3. The invention as set forth in claim 1 wherein the desired secondary pressure in step c) is calculated (120) in accordance with an equation in which the desired secondary pressure is equal to the desired secondary force minus the product of the secondary speed and the secondary actuator centrifugal force coefficient minus the product of the maximum secondary sheave position less the secondary sheave position and the secondary sheave spring constant minus the minimum secondary sheave spring force all of the above being divided by the secondary actuator area.

4. The invention as set forth in claim 1 including the following additional steps:
   i) calculate (200) an estimated primary pressure based on primary speed, secondary speed, throttle, and secondary pressure;
   j) compare (202) the estimated primary pressure to the primary pressure set point to get an error signal;
   k) calculate adjustment terms (204) for the secondary pressure set point and the ratio controller duty cycle limit based upon the error signal: and
   l) add the adjustment terms (206, 208) to the pressure set point and the ratio duty cycle limit.

5. The invention as set forth in claim 4 wherein the following step is performed following step i):
   m) calculate (200) a second estimated primary pressure based upon the ratio controller duty cycle limit.

6. The invention as set forth in claim 5 wherein the following steps are performed following step m):
   n) combine the first and second estimated primary pressure to arrive at a final estimated primary pressure; and
   o) compare (202) the final estimated primary pressure to the primary pressure set point to get an error signal.

7. A method of downshifting a continuously variable transmission, of the type having adjustable radius primary and secondary pulleys that are connected by an endless drive element and are hydraulically controlled by primary and secondary forces, to avoid slip between drive the element and the primary pulley by controlling the drive element ratio and primary force comprising the steps of:
   a) initiate a downshift,
   b) calculate (108) a desired primary pressure that corresponds to the downshift,
   c) select (116) a ratio controller duty cycle limit corresponding to the downshift;
   d) calculate (120) a desired secondary pressure that corresponds to a desired primary force,
   e) compare (122) said desired secondary pressure to a known secondary pressure maximum,
   f) repeating steps (c) through (e) for values of secondary pressure that exceed the known secondary pressure maximum until an acceptable secondary pressure is achieved,
   g) measure the actual primary pressure in the continuously variable transmission,
   h) compare (202) the actual primary pressure that has been measured in the continuously variable transmission to the primary pressure set point to get an error signal,
   i) calculate adjustment terms (204) for the secondary pressure set point and the ratio controller duty cycle limit based upon the error signal,
   j) add the adjustment terms (206, 208) to the secondary pressure set point and the ratio controller duty cycle limit, and
   k) use the adjusted secondary pressure set point and adjusted ratio duty cycle limit in the continuously variable transmission.

8. A method of downshifting a continuously variable transmission, of the type having adjustable radius primary and secondary pulleys that are connected by an endless drive element and are hydraulically controlled by primary and secondary forces, to avoid slip between the drive element and the primary pulley by controlling the drive element ratio and primary force to substantially prevent slip between the primary pulley and the drive element comprising the steps of:
   a) initiate a downshift (101);
   b) calculate a new desired primary pressure (108);
   c) compare the new desired primary pressure to a known minimum primary pressure, (110);
   d) calculate a new desired primary pressure for values of new desired primary pressure that are not equal or greater than the minimum primary pressure until the new desired primary pressure is equal to or greater than the minimum primary pressure, and calculate a desired primary force;
   e) establish a new shift rate (114) based upon the mode of operation of the continuously variable transmission, the engine throttle position, the chain-belt ratio and the primary engine speed;
   f) select from desired primary pressure and shift-rate data, the ratio controller duty cycle limit (116);
   g) select from desired primary force and selected ratio controller duty cycle limit data, the desired secondary force (118);
   h) calculate the desired secondary pressure that corresponds to the desired secondary force (120);
   i) compare the desired secondary pressure to the maximum secondary pressure (122), if the desired secondary pressure is larger then increase the shift time (123) and return to the step (116) where a new ratio controller duty cycle limit is selected;
   j) compare (126-128) the desired secondary pressure to the existing secondary pressure and use (130) the higher as the new secondary pressure set point; and
   k) use the selected ratio controller duty cycle limit and the new line pressure set point in the continuously variable transmission.

9. The invention as set forth in claim 8 wherein the new desired primary pressure in step b) is initially calculated (108) in accordance with an equation in which the new desired primary pressure is equal to the desired primary force minus the primary speed squared multiplied by the primary actuator centrifugal force coefficient all divided by the primary actuator pressure area.

10. The invention as set forth in claim 8 wherein the desired secondary pressure in steps h) is calculated (120) in accordance with an equation in which the desired secondary pressure is equal to the desired secondary force minus the product of the secondary speed and the secondary actuator centrifugal force coefficient minus the product of the maximum secondary sheave position less the secondary sheave position and the secondary sheave spring constant minus the minimum secondary sheave spring force all of the above being divided by the secondary actuator area.

11. The invention as set forth in claim 8, including the following additional steps:
   l) calculate (200) an estimated primary pressure based on primary speed, secondary speed, throttle, and secondary pressure;

m) compare (202) the estimated primary pressure to the primary pressure set point to get an error signal;

n) calculate adjustment terms (204) for the secondary pressure set point and the ratio controller duty cycle limit based upon the error signal; and o) add the adjustment terms (206, 208) to the pressure set point and the ratio duty cycle limit.

12. The invention as set forth in claim 11 wherein the following additional steps are performed following step 1):

p) calculate (200) a second estimated primary pressure based upon the ratio controller duty cycle; and q) combine the first and second estimated primary pressure to arrive at a final estimated primary pressure.

13. A method of downshifting a continuously variable transmission, of the type having adjustable radius primary and secondary pulleys that are connected by an endless drive element and are hydraulically controlled by primary and secondary forces, to avoid slip between the drive element and the primary pulley by controlling the drive element ratio and primary force to substantially prevent slip between the primary pulley and the drive element comprising the steps of:

a) initiate a downshift (101);

b) calculate a new desired primary pressure (108);

c) compare the new desired primary pressure to a known minimum primary pressure (110);

d) calculate a new desired primary pressure for values of new desired primary pressure that are not equal or greater than the minimum primary pressure until the new desired primary pressure is equal or greater than the minimum primary pressure, and calculate a desired primary force;

e) establish a new shift time (114);

f) select from a test data table a ratio controller duty cycle limit (116);

g) select from a test data table the desired secondary force (118);

h) calculate the desired secondary pressure that corresponds to the desired secondary force (120);

i) compare the desired secondary pressure to the maximum secondary pressure 122), if the desired secondary pressure is larger then increase the shift time (123) and return to the step (116) where a new ratio controller duty cycle limit is selected; and j) repeating steps (e) through (i) for values of desired secondary pressure that exceed the maximum secondary pressure until an acceptable desired secondary pressure is achieved;

k) compare (126-128) the desired secondary pressure to the existing secondary pressure and use (130) the higher as the new secondary pressure set point;

l) measure the actual primary pressure in the continuously variable transmission;

m) compare (202) the actual primary pressure that has been measured in the continuously variable transmission to the primary pressure set point to get an error signal;

n) calculate adjustment terms (204) for the secondary pressure set point and the ratio controller duty cycle limit based upon the error signal; and o) add the adjustment terms (206, 208) to the primary pressure set point and the ratio controller duty cycle limit; and p) use the adjusted primary pressure set point and adjusted ratio controller duty cycle limit in the continuously variable transmission.

* * * * *